(No Model.)

E. WHISSON.
FORCEPS.

No. 525,300. Patented Aug. 28, 1894.

Witnesses:
J. B. McGivr.
Archie G. Reese.

Inventor
Elisha Whisson
by Frank L. Dyer,
Attorney

THE NORRIS PETERS CO., PHOTO-LITHO., WASHINGTON, D. C.

UNITED STATES PATENT OFFICE.

ELISHA WHISSON, OF LE MARS, IOWA, ASSIGNOR OF ONE-HALF TO H. W. WILCOX, OF SAME PLACE.

FORCEPS.

SPECIFICATION forming part of Letters Patent No. 525,300, dated August 28, 1894.

Application filed March 17, 1894. Serial No. 504,095. (No model.)

*To all whom it may concern:*

Be it known that I, ELISHA WHISSON, a citizen of the United States, residing at Le Mars, in the county of Plymouth and State of Iowa, have invented certain new and useful Improvements in Forceps; and I do hereby declare the following to be a full, clear, and exact description of the invention, which will enable others skilled in the art to which it appertains to make and use the same.

My invention relates to various new and useful improvements in obstetrical forceps, particularly designed for assisting pigs and other animals in delivery.

The principal object of the invention is to provide and produce forceps which can be manufactured cheaply and be used with safety irrespective of the variety of presentation whether of head or of leg.

For a better comprehension of the invention, attention is directed to the accompanying drawings, forming part of this specification, and in which—

Figure 1:
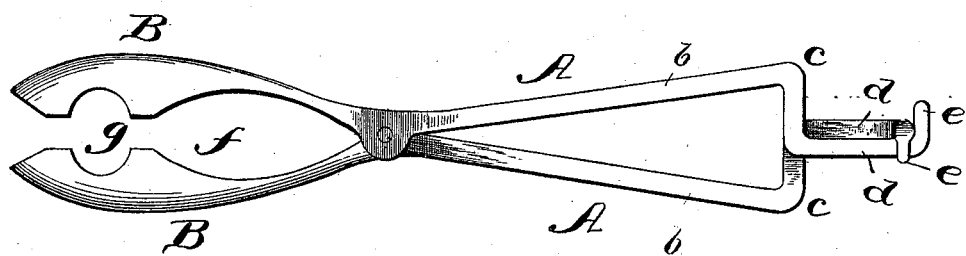
Figure 2:
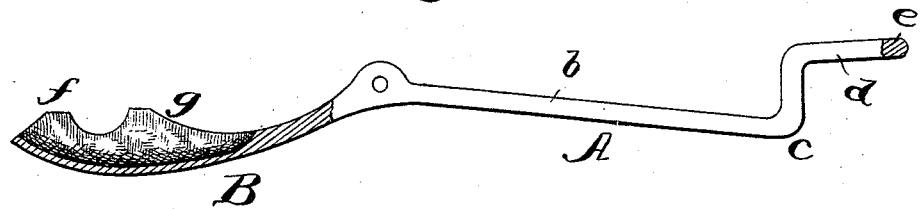
Figure 3:
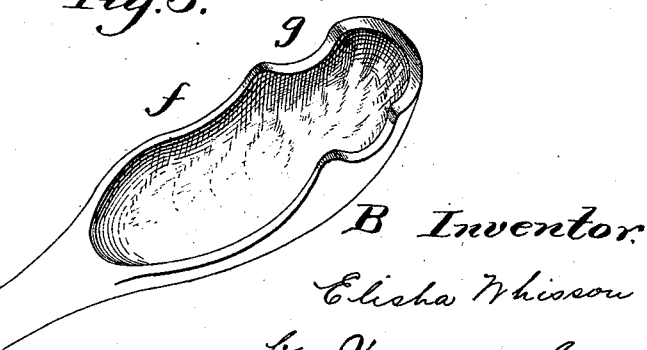

Figure 1, is a side elevation of my improved forceps in closed position; Fig. 2, a sectional view of one of the portions thereof, and Fig. 3, an enlarged perspective view of one of the bowls.

In all of the above views corresponding parts are designated by similar letters of reference.

My improved forceps are composed of two portions pivoted together, each consisting of a handle having a bowl at one of its ends, the said handle and bowl being of novel construction and capable of new uses as I shall proceed to explain.

A A, are the two handles pivoted at *a*, and made preferably of steel of any desirable cross-sectional shape. The handles are provided with the inclined main portions *b*, which separate gradually toward the rear end, with the bent in portions *c, c*, with the parallel handle portions *d, d*, which overlap each other, and by means of which the instrument is used, and with the outwardly bent ends *e, e*, which cross each other as shown, and which prevent the hands of the person operating the instrument from slipping. Each handle is also provided at its forward end with a bowl or head B, which is preferably made integral with the handle A, and the construction of which is clearly illustrated in Fig. 3. In cross-section each bowl or head B, is made circular of any desired thickness, its outer face being convex and its inner part being concave. By this construction a rib or edge *f*, is formed, running substantially entirely around the said bowl or head. This rib or edge *f*, is formed with teeth *g*, therein which materially increase the grip of the instrument in head delivery; but this rib at the extreme front portions of each bowl or head is made perfectly plain, so that in leg presentations there can be no danger of injuring the sow between the two heads or bowls B, as is now the case with many instruments of this kind.

When the instrument is to be used the handle portions *d, d*, are separated until the inclined portions *b, b*, are parallel, and the bowls or heads are opened to grasp the head or leg of the young as presented. The handle portions are now closed and if a head presentation the skull will be received between the body portions of the bowls, while if a leg presentation, the leg will be grasped between the two ribs or edges *f*, at the front part of the instrument. By crossing the ends *e, e*, as shown, the gripping part of the forceps cannot be entirely closed together, and therefore there can be no danger of ripping or otherwise damaging the muscles or other parts.

What I claim is—

The improved obstetrical forceps consisting of the handles A, having the inclined portions *b, b*, handle portions *d, d*, and crossed ends, *e, e;* and the bowls or heads B, having the rib or edge *f*, substantially as set forth.

In testimony whereof I affix my signature in presence of two witnesses.

ELISHA WHISSON.

Witnesses:
WILBUR RUICK,
H. S. PAYN.